(12) United States Patent
Axelrod et al.

(10) Patent No.: US 6,200,616 B1
(45) Date of Patent: *Mar. 13, 2001

(54) ANIMAL CHEW

(75) Inventors: Glen S. Axelrod; Ajay Gajria, both of Neptune City, NJ (US)

(73) Assignee: TFH Publications, Inc., Neptune City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/302,814

(22) Filed: Apr. 30, 1999

Related U.S. Application Data

(63) Continuation-in-part of application No. 09/138,804, filed on Aug. 21, 1998, now Pat. No. 6,126,978, which is a continuation-in-part of application No. 08/738,423, filed on Oct. 25, 1996, now Pat. No. 5,827,565.

(51) Int. Cl.$^7$ ........................................ A23K 1/00
(52) U.S. Cl. ................ 426/285; 426/560; 426/650; 426/805; 426/661; 426/658
(58) Field of Search ................ 426/285, 560, 426/650, 805, 658, 661

(56) References Cited

U.S. PATENT DOCUMENTS

| | | | |
|---|---|---|---|
| 3,871,334 | 3/1975 | Axelrod | 119/29.5 |
| 4,145,447 * | 3/1979 | Fisher et al. | 426/72 |
| 4,513,014 | 4/1985 | Edwards | 426/132 |
| 4,557,219 | 12/1985 | Edwards | 119/29.5 |
| 4,691,718 | 9/1987 | Sakuma et al. | 132/84 R |
| 4,735,808 * | 4/1988 | Scaglione et al. | 426/62 |
| 4,771,773 | 9/1988 | Kropf | 128/303 R |
| 4,969,868 | 11/1990 | Wang | 604/20 |
| 4,985,964 | 1/1991 | Lawson | 452/135 |
| 4,997,671 * | 3/1991 | Spanier | 426/646 |
| 5,007,879 | 4/1991 | Lawson | 452/198 |
| 5,138,733 | 8/1992 | Bock | 15/22.1 |
| 5,149,550 | 9/1992 | Mohilef | 426/3 |
| 5,200,212 | 4/1993 | Axelrod | 426/2 |
| 5,240,720 | 8/1993 | Axelrod | 426/2 |
| 5,407,661 | 4/1995 | Simone et al. | 424/49 |
| 5,476,069 | 12/1995 | Axelrod | 119/709 |
| 5,635,237 | 6/1997 | Greenberg et al. | 426/646 |
| 5,711,254 | 1/1998 | O'Rourke | 119/710 |
| 5,750,196 | 5/1998 | Welch | 427/290 |
| 5,786,382 | 6/1998 | Childers-Zadah | 514/629 |
| 5,827,565 * | 10/1998 | Axelrod | 426/623 |
| 5,941,197 * | 8/1999 | Axelrod | 119/710 |

* cited by examiner

Primary Examiner—Chhaya D. Sayala
(74) Attorney, Agent, or Firm—Hayes, Soloway, Hennessey, Grossman & Hage, P.C.

(57) ABSTRACT

An animal chew which is made from molded fruit chips. In a second embodiment, an animal chew which is made from a molded thermoplastic resin having fruit chips dispersed therein. In a third embodiment, an animal chew which is made from starch having fruit chips dispersed therein.

64 Claims, 3 Drawing Sheets

ANIMAL CHEW

CROSS REFERENCE TO RELATED APPLICATIONS

This application is a continuation-in-part of U.S. patent application Ser. No. 09/138,804, filed Aug. 21, 1998 U.S. Pat. No. 6,126,978 which is a continuation-in-part of U.S. patent application Ser. No. 08/738,423, filed Oct. 25, 1996, now U.S. Pat. No. 5,827,565.

FIELD OF THE INVENTION

The present invention relates to an improved animal chew toy and process for forming such chew toy comprising the molding of fruit chips and/or the use of fruit chips in a thermoplastic molding and/or the use of fruit chips in a molded starch chew toy.

BACKGROUND OF THE INVENTION

In U.S. Pat. No. 5,827,565 it is pointed out that most dogs enjoy chewing on a flavored object although preferences vary as to the hardness. Some dogs like to chew on very hard materials such as cow bones, wood, nylon, while other prefer softer chews such as polyurethane or rubber while still others favor freeze dried snacks. Some dogs, due to their age, may not be able to chew on very hard substances. Young dogs have insufficiently developed teeth, while old dogs may have diseased gums or may have lost some of their teeth.

Many indigestible objects are given to dogs as a chew and although the dogs may enjoy chewing on thereon, the objects are often swallowed in whole or in part. Once swallowed, these objects or fragments can have an adverse effect on the dogs digestion and can become impacted in the dog's intestinal tract with life-threatening consequences. By way of example, dog chews have been marketed which utilize an ethylene copolymer which can be fractured by the chewing action of a dog, and when ingested can block the dog's stomach passages.

Other edible dog chews have been marketed which have a comparatively short shelf life and therefore must be replaced by retail outlets at frequent intervals. Yet other prior art dog chews are lacking the structural integrity whereby they are susceptible to breakage during handling and shipping.

Applicant's assignee, T. F. H. Publications Inc., has previously developed an edible dog chew that is wholly digestible, nutritious and maintains a texture or hardness which is individually adjustable by the application of heat to suit a wide variety of a dog's preferences or needs. Such dog chews utilize a mixture containing primarily casein and are described in U.S. Pat. Nos. 5,200,212 and 5,240,720.

In Applicant's U.S. Pat. No. 5,827,565 there is disclosed a process for making a heat expandable dog chew comprised primarily of injection molding potato starch granules and an attractant. Attractants recited include chicken powder, liver powder, ham, turkey, beef and or fish. Natural vegetable additives such as spinach or carrots also may be added. The resultant mixture is molded under heat and pressure into a desired form, such as a dog bone. The dog bone so produced can be modified in texture or hardness by subsequent heating, preferably in a microwave oven.

In Applicant's U.S. patent application Ser. No. 09/138,804, which as noted is a continuation-in-part of U.S. Pat. No. 5,827,565, there is disclosed a dog chew having natural fruit flavor to increase the dog's appetite for such chew. Such fruit flavored dog chew may also include natural food coloring to enhance the attractiveness of the chew to the dog owner. The food coloring may also correspond to the fruit flavor, and the dog chew disclosed therein may also embody a breath sweetener for a dog such as mint, spearmint, peppermint or wintergreen and may also include parsley. The preferred form of such edible chew maintained the basic ingredient of a heat-expandable starch, such as potato starch. Fruit flavoring may be added to the granules of a mixture of potato starch, water and calcium carbonate along with natural fruit flavorings.

Attention is also directed to the following U.S. Patents and copending applications, commonly owned by the assignee herein: U.S. Pat. No. 5,476,069; U.S. patent application Ser. No.: 08/923,070 filed Sep. 3, 1997 entitled "Vegetable Based Dog Chew"; now U.S. Pat. No. 6,093,427 08/738,423 filed Oct. 25, 1997 entitled "Edible Dog Chew" now U.S. Pat. No. 5,827,565; 08/784,834 filed Jan. 17, 1997 entitled "Carrot-Based Dog Chew"now U.S. Pat. No. 5,941,197; 08/888,611 filed Jul. 7, 1997 entitled "Vegetable Dog Chew" abandoned ; 09/114,872 filed Jul. 14, 1998 entitled "Heat Modifiable Edible Dog Chew"; 09/138,804 filed Aug. 21, 1998 entitled "Improved Edible Dog Chew" now U.S. Pat. No. 6,126,978; 09/116,070 filed Jul. 15, 1998 entitled "Wheat & Casein Dow Chew With Modifiable Texture" now U.S. Pat. No. 6,110,521; 09/116,555 filed Jul. 15, 1998 entitled "Heat Modifiable Peanut Dog Chew" now U.S. Pat. No. 6,093,441; 09/227,767 filed Jan. 8, 1999 entitled "Method of Molding Edible Starch." In addition to such patents and applications, attention is also directed to the art cited in said patents and applications, as such art relates to the field of molded starch products.

With respect to the prior art related to fruit chip and fruit chip manufacture, attention is directed to U.S. Pat. Nos. 4,547,376 and 4,767,630 which disclose a method for producing dry, sweetened, wafer-thin sliced fruit or vegetable product by exposing only one surface of the slices to an aqueous solution containing carbohydrate and a browning an anti-browning agent and an acid and drying in monolayers.

In addition, the prior art has recently grown considerably to include a variety of other disclosures directed at flavored pet products.

For example, U.S. Pat. No. 5,786,383 entitled "Use of Valerian Plant and/or Root as a Scent-Attractant for Stimulating Canines and Felines". This patent discloses the use of the herb/plant Valerian in all of its forms whether whole or in part, for use in food product, in such a manner that the natural aroma emitted by the Valerian plant will act as a scent/attractant for dogs and cats.

U.S. Pat. Nos. 4,985,964 and 5,007,879 entitled "Dog Chew Processing Method" disclose methods for processing cattle hoofs for use as a dog chew product.

U.S. Pat. No. 5,149,550 entitled "Methods for Making Pet Chews" discloses that ligaments from cattle and other hoofstocks are rendered substantially free of fat and can be dried and hardened for use as a pet chew.

U.S. Pat. No. 5,407,661 entitled "Pet Chew Product Having Oral Care Properties discloses an edible pet chew product having a flexible cellular matrix in which is contained cellulosic fibrous material such as corn cob fractions which are described as having a mechanical cleansing function when chewed by a pet.

U.S. Pat. No. 5,635,237 entitled "Method of Manufacturing Substantially Pure Rawhide Pet Products" discloses a chew of pure rawhide utilizing twin screw extrusion with multiple heating zones and interchangeable extrusion dies.

U.S. Pat. No. 5,711,254 entitled "Dog Chew Toy" discloses a chew toy for dogs formed of a length of composite rope having an inner core defined by strands of twisted threads of natural plant or synthetic fibers and a soft outer shell defined by a plurality of strands of soft cotton threads twisted about the inner core. The inner core is said to be less water absorbent than the outer shell to promote drying of the toy when wetted with dog saliva to inhibit bacteria growth.

U.S. Pat. No. 5,750,196 entitled "Process for Manufacturing Dog Chew Toys of Tire Sidewalls" discloses the use of a dye to cut toy bases from sidewalls recovered from used tires.

Other earlier examples of such products are disclosed in U.S. Pat. No. 3,871,334 to Axelrod (nylon substrate containing liquid flavor and odor components) and U.S. Pat. No. 4,771,773 to Axelrod (polyurethane toy containing aqueous-based flavor and odor components). U.S. Pat. Nos. 4,557,219 and 4,513,014 to Edwards disclose the use of flavorings in a molded polyurethane chew objects.

Accordingly, it is an object herein to improve further upon Applicant's earlier disclosures of making a heat expandable dog chew and use of natural flavorings to increase the animal's appetite for such chew. In addition, it is also an object herein, with respect to use of natural flavorings such as fruit chips, to mold such chips entirely on their own into a pet chew toy. Furthermore, it is also an object of the present invention to add such natural flavoring fruit chip material into either a natural or thermoplastic type polymer resin matrix in order to expand considerably the range of pet chew toys currently available.

SUMMARY OF THE INVENTION

An improved animal chew, and a process for forming such an animal chew, comprising molded fruit chips. In a second embodiment, an improved animal chew comprising a molded thermoplastic resin having fruit chips dispersed therein. In a third embodiment, an improved animal chew comprising molded starch having fruit chips dispersed therein.

BRIEF DESCRIPTION OF THE DRAWING

The invention will be better understood from a reading of the following detailed description taken in conjunction with the drawings in which like reference designators are used to designate like elements, and in which.

DETAILED DESCRIPTION OF THE PREFERRED EMBODIMENTS

In a first embodiment of the invention, substantially dehydrated fruit chips, such as substantially dehydrated orange, grape, watermelon, banana, or apple slices, are molded under heat and pressure. The substantially dehydrated fruit chips used in this invention preferably have a weight percent water content between about 0.5 wt-% and about 20 wt-%.

Molding can be preferably accomplished in an injection molding machine at temperatures between about 250° F. to about 400° F., and pressures of about 1000 psi to about 2500 psi, depending upon the injection molding machine used, the particular mold, and the size of the chew being molded. As those skilled in the art will appreciate, the product may be molded into any of a variety of shapes, including a bone, rod, ring, disk, and the like. Accordingly, in broad aspects, although injection molding is preferred, any other type of molding process is contemplated. For example, the molded fruit chips herein are suitable for compression molding as well as other thermoplastic processing techniques available in the art.

Figure 1:
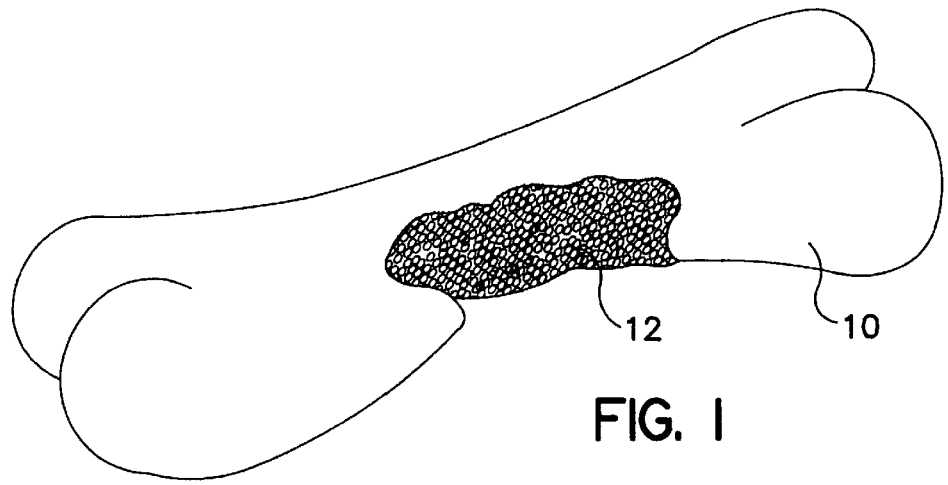
FIG. 1 is a perspective view of a bone-shaped animal chew formed from molded fruit chips.
Figure 2:
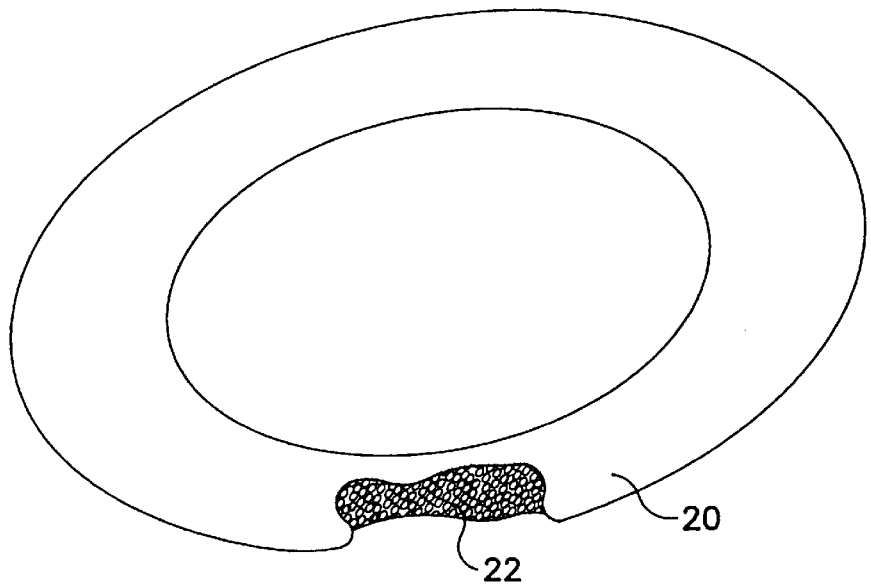
FIG. 2 is a perspective view of a ring-shaped animal chew formed from molded fruit chips.
Figure 3:
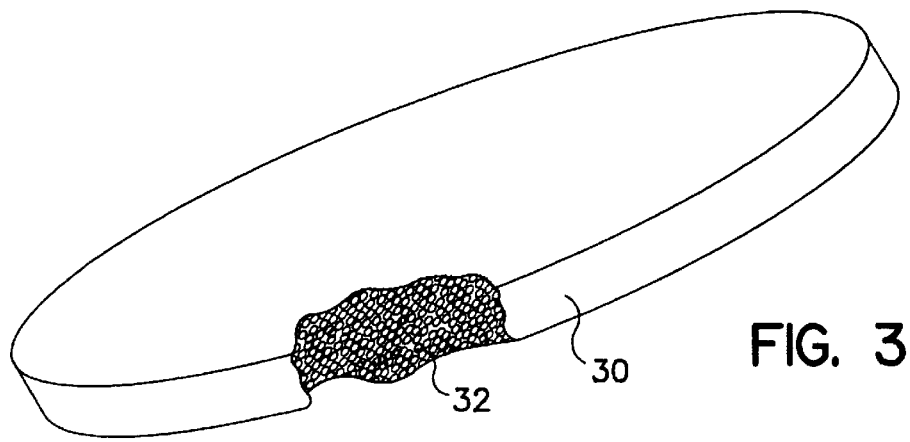
FIG. 3 is a perspective view of a disk-shaped animal chew formed from molded fruit chips.

For example as shown on FIG. 1, the animal chew of this embodiment can be preferably shaped as molded bone 10 which comprises molded fruit chips 12. Alternatively as shown on FIG. 2, the animal chew can be shaped as molded ring 20 comprising molded fruit chips 22. In addition and as shown on FIG. 3, the animal chew of this embodiment can be shaped as molded disk 30 comprising molded fruit chips 32.

In accordance with the present invention, additional fruit flavoring may optionally be added to the fruit chips during the molding process. This then would enhance the fruit flavoring already present by virtue of the fruit chips. Natural fruit flavorings are preferred. As will be appreciated by those skilled in the art, such fruit flavorings may comprise both powders and liquids. The weight content of such fruit flavorings in the animal chew of the present invention may be between about 0.25 wt-% and about 50 wt-%.

In addition, a bright food coloring may be added to the fruit chips prior to molding to enhance the attractiveness of the chew to a particular animal. Birds especially are attracted to bright colors. A natural food coloring is preferred, and the food coloring may or may not correspond to the fruit component or the additional fruit flavoring. The weight content of such food coloring in the present invention may preferably be between about 0.05 wt-% and about 10 wt-%.

In a second alternative embodiment of the present invention, the animal chew of the present invention comprises a shaped article which is formed of a molded thermoplastic matrix and of fruit chips dispersed in that matrix. Those skilled in the art will appreciate that suitable thermoplastic resins include those plastic resin materials that can be conveniently molded by melt processing techniques into a desired shape. Preferably, however, the synthetic thermoplastic resins which can include, for example, nylon, polyurethane, and mixtures thereof.

The animal chew formed in accordance with the present invention from polyurethane resins preferably has a hardness or durometer ranging from about 70 Shore A to about 60 Shore D as measured by ASTM (American Society for Testing and Materials) Test 2240, and most preferably between about 80 Shore A and about 90 Shore A. Polyurethane resins having hardnesses within the ranges specified above are usually satisfactory for the present invention. However, the durometer range can be widened to between 50 Shore A and 90 Shore D if desired.

The proportion of fruit chips which are dispersed in the thermoplastic resin can be varied within wide limits. For example, the weight component of the fruit chips may be from about 0.05% to about 50%, preferably from about 1% to about 10%.

The animal chew of this embodiment is preferably manufactured by adding the fruit chips to the thermoplastic resin before molding, mixing the fruit chips and thermoplastic resin, heating the resulting mixture to melting/plastication and then forming the resulting melt into the desired shaped article by conventional thermoplastic molding techniques. In that regard, and in the context of the present invention, injection molding is preferred, but also, those skilled in the art will recognize that other types of molding, e.g., extrusion molding through a die, or other similar type melt processing techniques, will be quite suitable.

Figure 4:
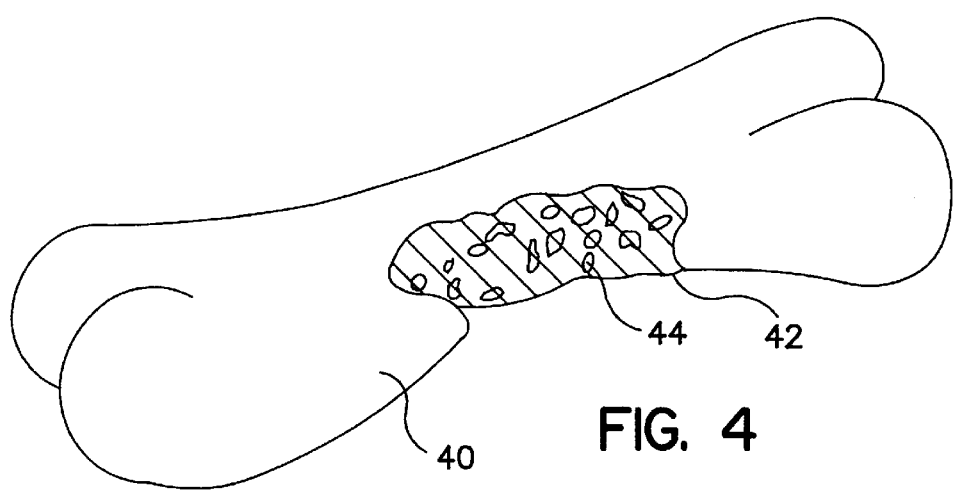
FIG. 4 is a perspective view of a bone-shaped animal chew formed from a molded thermoplastic resin containing fruit chips dispersed therein.
Figure 5:
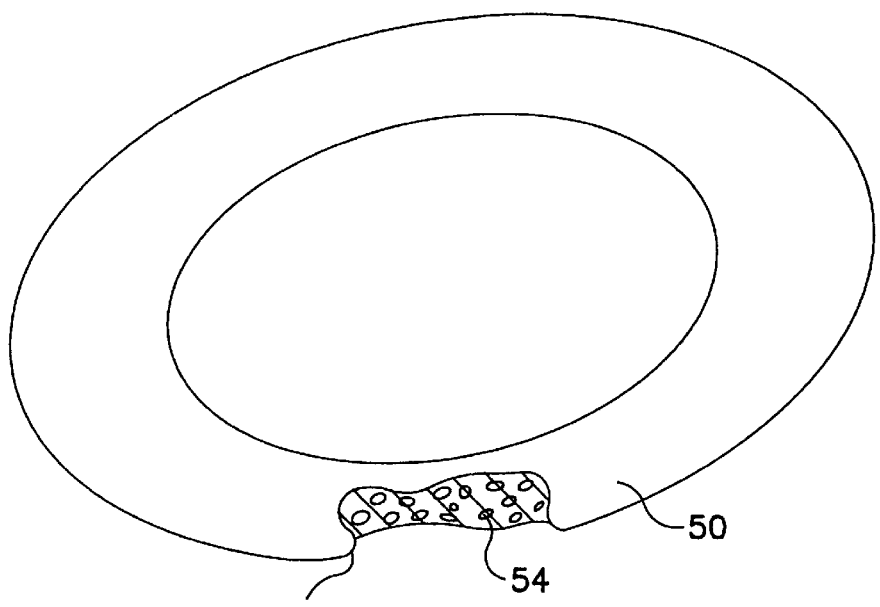
FIG. 5 is a perspective view of a ring-shaped animal chew formed from a molded thermoplastic resin containing fruit chips dispersed therein.
Figure 6:
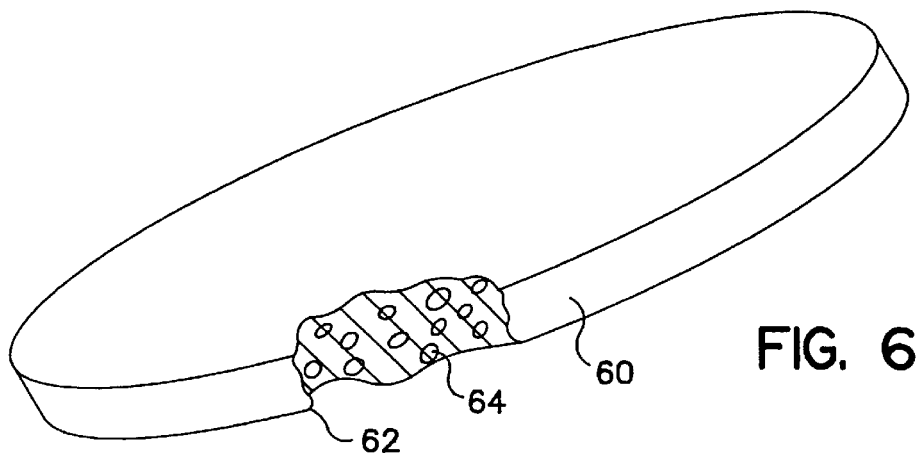
FIG. 6 is a perspective view of a disk-shaped animal chew formed from a molded thermoplastic resin containing fruit chips dispersed therein.

As those skilled in the art will further appreciate, the invention can be formed into any of a variety of shapes. For example as shown on FIG. 4, the animal chew of this embodiment can be shaped as molded bone 40 which comprises molded thermoplastic resin 42 containing fruit chips 44 dispersed therein. Alternatively as shown on FIG. 5, the animal chew can be shaped as molded ring 50 which comprises molded thermoplastic resin 52 containing fruit chips 54 dispersed therein. In addition and as shown on FIG. 6, the animal chew of this embodiment can be shaped as molded disk 60 which comprises molded thermoplastic resin 62 containing fruit chips 64 dispersed therein.

In accordance with the present invention, additional fruit flavoring may again be optionally added to the thermoplastic resin/fruit chip mixture before such mixture is molded. Natural fruit flavorings are again preferred. As will be appreciated by those skilled in the art, such fruit flavorings may comprise both powders and liquids. The weight content of such fruit flavorings in such mixture may be between about 0.25 wt-% and about 50 wt-%.

In addition, once again, a bright food coloring may be added to such mixture prior to molding. A natural food coloring is preferred, and the food coloring may or may not correspond to the fruit component or the additional fruit flavoring. The weight content of such food coloring in such mixture may be between about 0.05 wt-% and about 10 wt-%.

In an alternative method wherein the thermoplastic resin comprises polyurethane, or for that matter a particular polymer resin that can be rapidly formed (polymerized), the fruit chips, additional fruit flavoring, or food coloring may be added to the polyurethane components (monomers) during the manufacture of that polyurethane material. In formulating a polyurethane resin, there are several different types of components that either must be or may be used. These components can generally be classified into the following: isocyanates, polyols, chain extenders, catalysts, and non-reactive additives.

In general, the polyols, chain extenders, catalysts, and non-functional additives are first combined, and that resulting mixture is then subsequently added to the isocyanates to form the polyurethane. In this embodiment, the fruit chip component, fruit flavoring component, and/or food coloring component is preferably added to the polyols, chain extenders, and catalysts. That resulting mixture is then rapidly added to, and mixed with, the isocyanates to form a polyurethane reaction mixture. This reaction mixture is then injected into a mold to form the animal chew. After the reaction mixture has sufficiently solidified, the molded chew may be ejected or extracted from the mold.

Alternatively, the fruit chips can be added to the isocyanate, provided precautions are taken to reduce or eliminate any direct reaction between the isocyanate and fruit chip additive. In that regard, as noted herein, preferably, the fruit chips are substantially dehydrated fruit chips, which substantially dehydrated fruit chips are been found uniquely suitable for incorporating into a polyurethane polymerizing media. That is, by controlling the moisture level of the fruit chips, one can uniquely avoid the reaction of the isocyanate with water which will tends to cause foaming. However, at the preferred moisture levels of about 0.5 wt-% to about 5 wt-%, such fruit chips can be uniquely mixed in the polymerizing polyurethane media, where the fruit chips can become effectively bonded to the growing polyurethane chain, thereby uniquely becoming part of the final polyurethane matrix.

In a third exemplary embodiment of the invention, the animal chew of the present invention has as a basic ingredient a vegetable starch, or a vegetable starch and a vegetable flour, selected from any number of sources including but not limited to corn, rice, wheat, potato and tapioca. For example, a potato starch sold by AVEBE of Veendam, The Netherlands, under the trademark PARAGON IM 1010 may be used, as disclosed in Applicant's U.S. Pat. No. 5,827,565.

A vegetable starch or a combination of vegetable starches is extruded using a conventional extruder into beads or pellets of about 3 millimeters to about 10 millimeters in size. Water is added to the starch during the extrusion step so that the water content of the beads or pellets is between about 15 wt-% and about 20 wt-%. Calcium carbonate may be added to the starch to facilitate extrusion and serve as a nutritional source of calcium. The calcium carbonate is present in the extruded beads/pellets from about 1 wt-% to about 10 wt-%.

A fruit component such as for example, substantially dehydrated orange, grape, watermelon, banana, or apple chips, is added to the starch during the extrusion process and prior to molding the final product. The proportion of fruit chips which are dispersed in the starch mixture can be varied within wide limits. For example, the weight component of the fruit chips may be from between about 0.25 wt-% and about 50 wt-%, preferably from about 1 wt-% to about 10 wt-%.

The resulting starch and fruit chip mixture is molded under heat and pressure. For example, molding can be preferably accomplished in an injection molding machine having a nozzle temperature between about 250° F. to about 400° F., and pressures of about 1000 psi to about 2500 psi, depending upon the injection molding machine used, the particular mold, and the size of the chew being molded.

In an alternative embodiment, the starch, water, calcium carbonate mixture is first extruded, and the resulting beads/pellets are introduced into an injection molding machine. A fruit component such as for example, substantially dehydrated orange, grape, watermelon, banana, or apple chips, is then added to the bead mixture while the beads are in the injection molding machine.

In accordance with the present invention, again, additional fruit flavoring may be added to the extruded starch beads/pellets before such mixture is molded. Natural fruit flavorings are preferred. As will be appreciated by those skilled in the art, such fruit flavorings may comprise both powders and liquids. The weight content of such fruit flavorings in such mixture may be between about 0.25 wt-% and about 50 wt-%.

In addition, a bright food coloring may be added to such mixture. A natural food coloring is preferred, and the food coloring may or may not correspond to the fruit component or the additional fruit flavoring. The weight content of such food coloring in such mixture may be between about 0.05 wt-% and about 10 wt-%.

The heat and pressure of the injection molding process cause most of the bead particles to mix with the fruit component, and/or calcium carbonate. In addition, the molding process also sterilizes the mixture. The product may then be molded into any of a variety of shapes.

Figure 7:
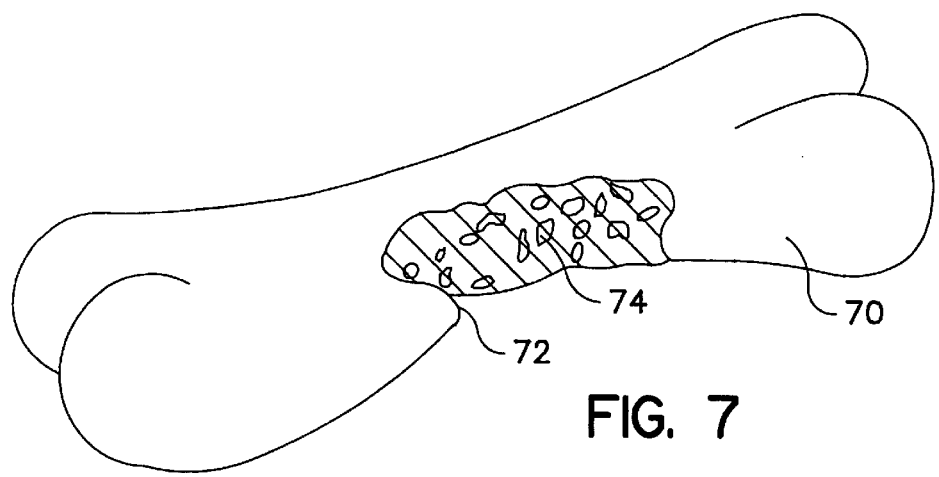
FIG. 7 is a perspective view of a bone-shaped animal chew formed from molded starch containing fruit chips dispersed therein.
Figure 8:
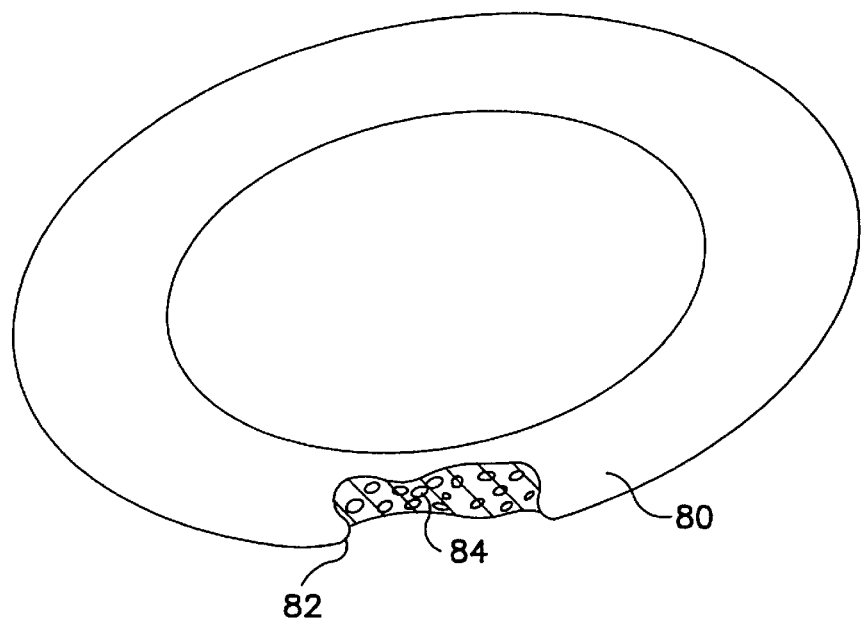
FIG. 8 is a perspective view of a ring-shaped animal chew formed from molded starch containing fruit chips dispersed therein.
Figure 9:
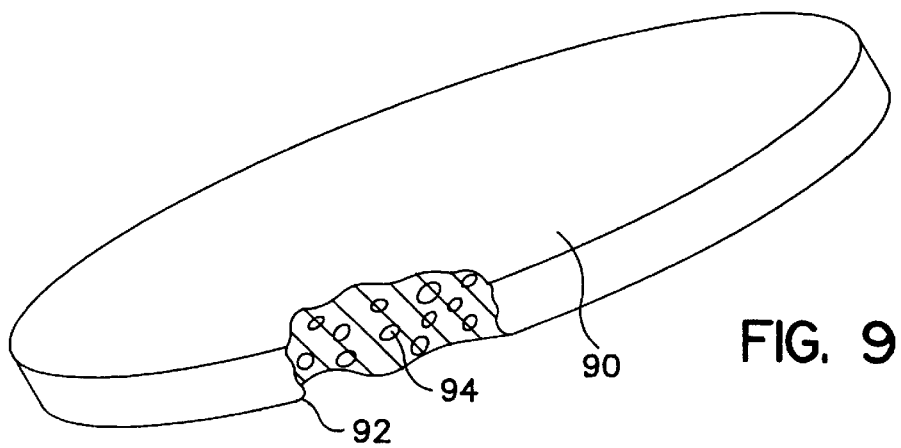
FIG. 9 is a perspective view of a disk-shaped animal chew formed from molded starch containing fruit chips dispersed therein.

For example as shown on FIG. 7, the animal chew of this embodiment can be shaped as molded bone 70 which comprises molded starch 72 containing fruit chips 74 dispersed therein. Alternatively as shown on FIG. 8, the animal chew can be shaped as molded ring 80 which comprises molded starch 82 containing fruit chips 84 dispersed therein. In addition and as shown on FIG. 9, the animal chew of this embodiment can be shaped as molded disk 90 which comprises molded starch 92 containing fruit chips 94 dispersed therein.

After the molded product has cooled sufficiently to cause the molded form to solidify, it may be ejected or extracted from the mold. Upon ejection from the injection molding machine the weight content of moisture in the chew is between about 5 wt-% and about 20 wt-%, preferably between about 10 wt-% and about 15 wt-%.

The following example is presented to further illustrate to persons skilled in the art how to make and use the invention and to identify a presently preferred embodiment thereof. This example is not intended as a limitation, however, upon the scope of the invention, which is defined only by the appended claims.

EXAMPLE 1

This example produces a starch-based animal chew containing dehydrated apple chips. In this Example, 2.65 pounds of dehydrated apple chips were mixed with 100 pounds of potato starch sold by AVEBE of Veendam, The Netherlands, under the trademark PARAGON 1010 IM. The PARAGON 1010 IM is sold in the form of thermoplastic granules which can be injection molded in accordance with the molding processing conditions disclosed herein. The water level of this PARAGON 1010 1M/dehydrated apple chip mixture was adjusted to about 15%.

This PARAGON 1010 1M/dehydrated apple chip/water mixture was then injection molded using a pressure of about 2,000 PSI and using the following temperature profile: Zone 4 (closest to hopper)=about 70° F.; Zone 3=about 150° F; Zone 2=about 300° F; Zone 1= about 375° F.; Nozzle about 390° F. The mold temperature was set at about 65° F.

What is claimed is:

1. An animal chew consisting essentially of molded substantially dehydrated fruit chips.

2. The animal chew of claim 1, wherein said animal chew consists essentially of injection molded fruit chips.

3. The animal chew of claim 1, wherein said animal chew consists essentially of compression molded fruit chips.

4. The animal chew of claim 1, wherein said fruit chips are selected from the group consisting of orange chips, grape chips, watermelon chips, banana chips, apple chips, and mixtures thereof.

5. The animal chew of claim 1, wherein said fruit chips have a moisture content of about 0.5 wt % to about 20 wt %.

6. The animal chew of claim 1, having the shape of a dog bone, ring, or disk.

7. An animal chew consisting essentially of a molded synthetic thermoplastic matrix and substantially dehydrated fruit chips dispersed throughout said matrix.

8. The animal chew of claim 7, wherein said fruit chips are selected from the group consisting of orange chips, grape chips, watermelon chips, banana chips, apple chips, and mixtures thereof.

9. The animal chew of claim 7, wherein said synthetic thermoplastic matrix comprises nylon or polyurethane.

10. The animal chew of claim 7, having the shape of a dog bone, ring, or disk.

11. The animal chew of claim 7, wherein said animal chew has a hardness between about 50 Shore A and about 90 Shore D.

12. The animal chew of claim 7, wherein said animal chew is injection molded or compression molded.

13. The animal chew of claim 7, wherein the weight component of said fruit chips is between about 0.05 wt-% and about 50 wt-%.

14. An animal chew comprising a molded mixture of starch and fruit chips, wherein the fruit chips are present in amount from about 1 wt % to about 10 wt %.

15. The animal chew of claim 14, wherein said starch is selected from the group consisting of potato starch, corn starch, rice starch, wheat starch, tapioca starch and mixtures thereof.

16. The animal chew of claim 14, wherein said fruit chips are selected from the group consisting of orange chips, grape chips, watermelon chips, banana chips, apple chips, and mixtures thereof.

17. The animal chew of claim 14, further comprising a food coloring.

18. The animal chew of claim 14, further comprising a fruit flavoring.

19. The animal chew of claim 18, wherein said fruit flavoring comprises a liquid or powdered flavoring.

20. The animal chew of claim 18, wherein said fruit flavoring is selected from the group consisting of orange flavoring, grape flavoring, watermelon flavoring, banana flavoring, apple flavoring, and mixtures thereof.

21. The animal chew of claim 14, wherein said molded mixture of starch comprises an injection molded or compression molded mixture.

22. The animal chew of claim 14, having the shape of a dog bone, ring or disk.

23. An animal chew consisting essentially of molded substantially dehydrated fruit chips and a food coloring.

24. An animal chew consisting essentially of molded substantially dehydrated fruit chips and a fruit flavoring.

25. The animal chew of claim 24, wherein said fruit flavoring comprises a liquid or powdered flavoring.

26. The animal chew of claim 24, wherein said fruit flavoring is orange flavoring, grape flavoring, watermelon flavoring, banana flavoring, apple flavoring or mixture, thereof.

27. An animal chew consisting essentially of a molded synthetic thermoplastic matrix having substantially dehydrated fruit chips and a food coloring dispersed throughout said matrix.

28. An animal chew consisting essentially of a molded synthetic thermoplastic matrix having substantially dehydrated fruit chips and a fruit flavoring dispersed throughout said matrix.

29. The animal chew of claim 28, wherein said fruit flavoring comprises a liquid or a powdered flavoring.

30. The animal chew of claim 28, wherein said fruit flavoring is selected from the group consisting of orange flavoring, grape flavoring, watermelon flavoring, banana flavoring, apple flavoring, and mixtures thereof.

31. A method of forming an animal chew consisting essentially of:
   a. supplying substantially dehydrated fruit chips; and
   b. molding said fruit chips to form the animal chew.

32. The method of claim 31, wherein said fruit chips are selected from the group consisting of orange chips, grape chips, watermelon chips, banana chips, apple chips, and mixtures thereof.

33. The method of claim 31, further comprising the step of adding a food coloring to said fruit chips before molding said fruit chips.

34. The method of claim 31, wherein the fruit chips have a moisture level of about 0.5 wt-% to about 20 wt-%.

35. The method of claim 31, wherein said molding comprises injection molding or compression molding.

36. The method of claim 31, wherein the animal chew formed has the shape of a dog bone, ring, or disk.

37. A method of forming an animal chew, consisting essentially of:
   a. supplying substantially dehydrated fruit chips and a synthetic thermoplastic resin;
   b. forming a mixture of said fruit chips and said thermoplastic resin; and
   c. molding said mixture of said fruit chips and said thermoplastic resin to form said animal chew.

38. The method of claim 37, wherein said synthetic thermoplastic resin comprises nylon or polyurethane resin.

39. The method of claim 37, wherein said molding comprises injection molding or compression molding.

40. The method of claim 37, wherein the weight component of said fruit chips is between about 0.05 wt-% and about 50 wt-%.

41. A method of forming an animal chew, consisting essentially of:
   a. supplying substantially dehydrated fruit chips;
   b. supplying a food coloring;
   c. forming a mixture of said fruit chips and said food coloring; and
   d. molding said mixture to form said animal chew.

42. The method of claim 37, wherein said animal chew has the shape of a dog bone, ring, or disk.

43. The method of claim 37, wherein said fruit chips are selected from the group consisting of orange chips, grape chips, watermelon chips, banana chips, apple chips, and mixtures thereof.

44. The method of claim 37, wherein said animal chew has a hardness between about 50 Shore A and about 90 Shore D.

45. The method of claim 37, wherein steps a and b comprise:
   a. supplying liquid monomer components required to form a selected polyurethane resin;
   b. supplying substantially dehydrated fruit chips;
   c. mixing said liquid monomer components with said fruit chips to provide a polyurethane reaction mixture;
   d. forming polyurethane resin containing fruit chips by allowing said reaction mixture to polymerize and harden; and
   e. granulating said polyurethane resin containing fruit chips.

46. The method of claim 45, wherein said fruit chips are selected from the group consisting of orange chips, grape chips, watermelon chips, banana chips, apple chips, and mixtures thereof.

47. The method of claim 45, wherein the weight component of said fruit chips is between about 0.05 wt-% and about 50 wt-%.

48. A method of producing an animal chew, comprising the steps of:
   (a) extruding a mixture of starch, water, and calcium carbonate to form pellets of about 3 millimeters to about 10 millimeters in size;

(b) forming a mixture of fruit chips and said pellets; and (c) molding said mixture to form said animal chew.

49. The method of claim 48, wherein the weight component of said fruit chips in said animal chew is about 0.05 wt % to about 50 wt %.

50. The method of claim 48, wherein said starch is selected from the group consisting of potato starch, corn starch, rice starch, wheat starch, tapioca starch and mixtures thereof.

51. The method of claim 48, wherein said fruit chips are selected from the group consisting of orange chips, grape chips, watermelon chips, banana chips, apple chips, and mixtures thereof.

52. The method of claim 48, further comprising the step of adding a food coloring to said mixture of fruit chips, starch, water, and calcium carbonate prior to molding that mixture.

53. The method of claim 48, further comprising the step of adding fruit flavoring to said mixture of fruit chips, starch, water, and calcium carbonate prior to molding that mixture.

54. The method of claim 53, wherein said fruit flavoring comprises a liquid or powdered flavoring.

55. The method of claim 53, wherein said fruit flavoring is orange flavoring, grape flavoring, watermelon flavoring, banana flavoring, apple flavoring or mixtures thereof.

56. The method of claim 48, wherein said animal chew is formed by injection molding or compression molding.

57. The method of claim 48, wherein the formed animal chew has the shape of a dog bone, ring or disk.

58. A method of forming an animal chew, consisting essentially of:

a. supplying substantially dehydrated fruit chips, a thermoplastic resin, and a food coloring;

b. forming a mixture from said fruit chips, said thermoplastic resin, and said food coloring; and c. molding said mixture to form said animal chew.

59. A method of forming an animal chew, consisting essentially of:

a. supplying substantially dehydrated fruit chips, a thermoplastic resin, and a fruit flavoring;

b. forming a mixture from said fruit chips, said thermoplastic resin, and said fruit flavoring; and c. molding said mixture to form said animal chew.

60. The method of claim 59, wherein said fruit flavoring comprises a liquid or powdered flavoring.

61. The method of claim 59, wherein said fruit flavoring is selected from the group consisting of orange flavoring, grape flavoring, watermelon flavoring, banana flavoring, apple flavoring, and mixtures thereof.

62. A method of forming an animal chew, consisting essentially of:

a. supplying substantially dehydrated fruit chips;

b. supplying a fruit flavoring;

c. forming a mixture of said fruit chips and said fruit flavoring; and d. molding said mixture to form said animal chew.

63. The method of claim 62, wherein said fruit flavoring comprises a liquid or a powdered flavoring.

64. The method of claim 62, wherein said fruit flavoring is selected from the group consisting of orange flavoring, grape flavoring, watermelon flavoring, banana flavoring, apple flavoring, and mixtures thereof.

* * * * *